Figure 1:
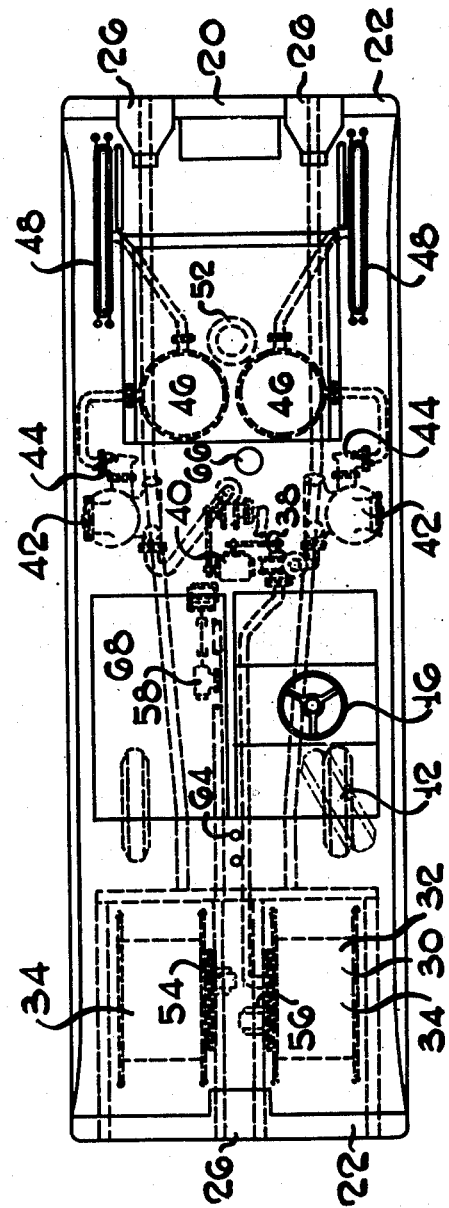

Oct. 10, 1950     J. E. KNIGHT     2,525,074
AIRPORT FUELING SYSTEM

Filed Sept. 14, 1945     2 Sheets-Sheet 1

Joseph E. Knight    Inventor
By _____ Attorney

Oct. 10, 1950     J. E. KNIGHT     2,525,074
AIRPORT FUELING SYSTEM

Filed Sept. 14, 1945     2 Sheets-Sheet 2

Joseph E. Knight   Inventor

By _____ Attorney

Patented Oct. 10, 1950

2,525,074

UNITED STATES PATENT OFFICE 2,525,074

AIRPORT FUELING SYSTEM

Joseph E. Knight, New Hyde Park, N. Y., assignor to Esso Export Corporation, a corporation of Delaware Application September 14, 1945, Serial No. 616,341

1 Claim. (Cl. 222—178)

This invention relates to an airport fueling system, and in particular to a combination of a pipe line system and a movable unit for fueling airplanes.

The fueling of airplanes at airports involves problems as to convenience of supplies and ready availability of filling means over the expanse of the airport grounds. At present, the gasoline is mainly stored in underground tanks, in pits and supplied to the airplanes by means of long hoses through which the aviation fuel is made to pass as a result of water displacement in the underground containers. The present invention is a departure from such designs involving the use of water in the dispensing of the fuel: it relates to a novel arrangement of an underground pipe supply system in combination with a surface movable supply transmitter.

The invention relates jointly to the design of a pipe system for the airport grounds and to an automobile surface supply unit by means of which the airplanes are directly fueled. Pipes are laid from fuel storage tanks under designated portions of the airport landing strip. Usually, pipes for carrying one or more grades of gasoline are considered advantageous. These ground lines run along the air strips or the portion of the field where the planes are fueled. This pipe system may consist of a single line with a number of take-offs or a loop system. The flow through the pipes may be by gravity or through the action of pumps. At convenient points along the lines, hydrant connections are made. To the hydrants are attached as required the second feature of the applicant's invention, namely, the movable surface fuel transmitter, or, as it may be conveniently termed, the fuel transmitter.

The movable unit consists usually of a gasoline automobile or other self-moving device fitted with unreeling drums on which a flexible fuel hose is wound. At one end of the hose, connection is made to the hydrants located on the underground pipe supply system. The hose on the transmitter unwinds as the unit moves across the field to where the plane is parked, the fuel hose running out as the vehicle proceeds. In order that the fuel transmitter may be suitable for the immediate refueling of the airplane, the design includes an engine, an air compressor to furnish air for the pumping of tires, etc., fuel pumps and meter systems, motors and filters for actually fueling the plane. In addition also, the fuel transmitter is built to have a low seating, and so that the operator may give his attention to the airplane refueling under convenient conditions, a platform movable in a vertical direction from the body of the transmitter is available. The lifting platform is preferably operated from the top of the platform itself by the man who handles the fuel lines, arranged so that he can stop it at any height up to about 15 feet. Vertical movement of this platform may be made by compressed air or by a screw system or by means of a hydraulic system. Within the fuel transmitter there may also be two fuel filling units and convenience for two men to operate, namely, one to drive the truck itself and the other to attend to the fueling and other servicing of the airplane as required. The seats in the unit may also be of a movable nature so that the service men can operate the unit easily in a forward and backward manner under relatively convenient conditions. Also, on the fuel transmitter there is an automatic rewind for the hose.

Figure 2:
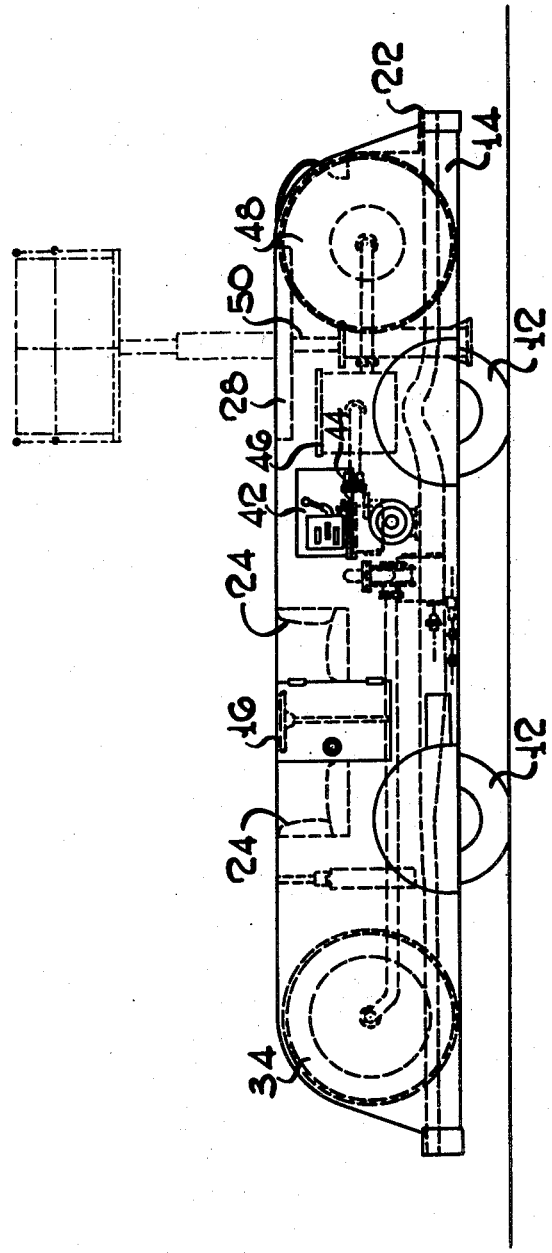

In order that the invention may be more fully understood, the following particular description and illustration of the fuel transmitting unit are presented. Figure 1 is a sectional plan view and Figure 2 is a sectional elevational view of the mobile fuel transmitter. In these drawings, similar parts are designated by similar reference numerals.

In these drawings, a chassis 10, such as of a light truck, is shown. The chassis is shown as being very low in height and as having conventional four wheels 12. The wheel base of the chassis is shortened to about 102 inches. The chassis is also lengthened on either end to approximately 73 inches from the center of the nearest wheels by welding on structural shapes 14. The steering mechanism differs from that of an ordinary truck in that the steering column 16 is in a vertical position. The steering mechanism is also located on the chassis more towards one end than the other to provide for better manipulation of the vehicle. Also, the clutch and brake mechanism is combined so as to be functionable on the same pedal. This clutch and brake mechanism is also lengthened so as to permit dual control in order that the vehicle may be operated from either side of the steering column 16. The emergency brake system is also fitted with a system of levers so that it may be operated from either side of the steering column 16.

The body or housing 20 is shown as being of distinctive streamline design. The material of which it is constructed in this case is aluminum so as to be of light weight. The body is provided with steel bumpers 22 at either end. Two seats 24 are furnished, one located on either side of the steering column 16. The body is also furnished at both ends with steps 26 with hand grips. The body has also an opening 28, of approximately 4 feet square, located over the rear axle, through which the hydraulic platform 50 may be raised.

Upon the chassis, two complete hose systems 30 are located. Each hose system consists of a suction hose reel 32 upon which is wound 100 feet of 2½-inch fuel type rubber hose 34. One end of the hose 34 is connected to the field hydrants, which in turn are connected directly to the main fuel supply lines from the storage tanks. The hose is also connected, by means of steel tubing 36, to the centrifugal gasoline pump 38. The pump 38 is driven by split shaft power take-off 40, which in turn is connected to the main drive shaft from the engine of the fuel transmitting unit. From the pump 38, connection is made to the combination strainer, air eliminator and meter 42. The meter 42 is equipped with a predetermined quantity valve 44. From the valve 44, connection is made by tubing to the filter 46 and thence through a swing joint into the discharge hose 48. The hose 48 is single wrapped on a spring loaded metal reel. The end of the fueling hose 48 is equipped with a nozzle provided with a shock-proof dash-pot mechanism for the delivery of the fuel into the tanks of the airplane to be fueled.

The nozzle end of the refueling hose 48 is raised to the appropriate position for refueling of the airplane tank by means of vertical movable platform 50 passing through opening 28 in the body 20. The platform 50 is provided with collapsible railing. The platform is raised by means of a hydraulic telescopic piston or hoist 52. The hydraulic pressure for operating the hoist as well as the two hydraulic motors 54 and 56 for winding the suction hose reels 34 is provided by a second power take-off 58 which also drives a hydraulic pump 60. The hydraulic hoist 52 is operated and controlled by means of the safety levers 62. These levers 62 are of the dead-man control type, located both on the platform 52 and close to the steering column 16 so as to be operable from either seat 24. A small air compressor 64 is attached to the automobile engine usually behind the radiator of the chassis 10. The compressor 64 supplies air to a small storage tank or receiver 66 with hose and valve connections for inflating the tires of the airplane being serviced. A storage space 68 is provided for lubricating oil and specialty products on the side of the vehicle, as well as a storage space 70 between the discharge hose reels 48.

The fuel transmitter as thus described and illustrated permits of the vehicle to be conveniently operated either backwards or forwards as desired and also allows the operator clear vision not only for driving but also for the service for which the unit as a whole is particularly adapted. The steps 26 with the hand grips provide conveniences for the men handling the refueling hose 48. By means of the predetermined quantity valve 44, a predetermined amount of gasoline can be set on the meter 42 dial so that when the predetermined amount of gasoline has been delivered the valve 44 automatically closes. Thus, the operator on the raised platform 50 has to care for merely the refueling of the airplane tank without consideration of the quantities involved.

The collapsible rail around the platform is a safety measure and convenience for the operator in fueling the airplane tanks.

The airport grounds upon which the mobile fuel transmitter operates are laid out extensively with underground piping from tank storage facilities, the piping at various points having easily available surface outlets or taps similar in construction to the fire hydrants in civic developments. Usually the airport grounds are laid out with two or more piping and hydrant systems so as to take care of repairs from time to time and to permit of several grades of fuel to be supplied to the mobile fuel transmitter.

In the above description and illustration, particular features of embodiment have been described. In these references to such particular embodiments, such features have been presented merely as illustrations of the invention rather than as any limitations of the invention.

What is claimed is:

An automotive fuel servicing unit for use in conjunction with a fuel distribution system having a plurality of hydrant outlets comprising a fuel transmitter vehicle including self-contained propulsion means therefor, said vehicle operable with equal facility in either of two directions, an elevatable servicing platform carried by said vehicle, a platform elevator including telescopic piston means supported on said vehicle at one end and connected at the other end to said platform, said means being operable to elevate and support said platform above the vehicle, transmitter equipment for fuel carried by said vehicle including a pump and rigid supply and discharge conduit members communicating therewith, a reel of a flexible conduit means supported on said vehicle communicating at one end with said rigid supply conduit, said flexible conduit being extensible from said reel and adapted for connection at the other end to a hydrant outlet, a second reel of a flexible conduit means supported on said vehicle communicating at one end with said rigid discharge conduit, said flexible conduit being extensible from the reel with the platform when elevated, fluid pressure means for energizing said telescopic piston to elevate said platform, separate driving means powered by said vehicle propulsion means to actuate the respective fluid pressure means and pump carried by said vehicle, and control means carried by said vehicle and the platform respectively, each adapted to establish and regulate an operating relationship between said fluid pressure means, the pump, and said driving and vehicle propulsion means as required for individual actuation of said pump and fluid pressure means thereby.

JOSEPH E. KNIGHT.

REFERENCES CITED

The following references are of record in the file of this patent:

UNITED STATES PATENTS

| Number | Name | Date |
|---|---|---|
| 596,676 | Ford et al. | Jan. 4, 1898 |
| 725,964 | Hogeland | Apr. 21, 1903 |
| 1,531,982 | Sago | Mar. 21, 1925 |
| 2,362,559 | Jauch et al. | Nov. 14, 1944 |